United States Patent
Guan et al.

(10) Patent No.: US 8,050,494 B2
(45) Date of Patent: Nov. 1, 2011

(54) SYSTEM AND METHOD FOR HUMAN HAND MOTION DETECTION BY SKIN COLOR PREDICTION

(75) Inventors: Haiying Guan, Bethesda, MD (US); Ning Xu, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 831 days.

(21) Appl. No.: 12/126,688

(22) Filed: May 23, 2008

(65) Prior Publication Data
US 2009/0290762 A1    Nov. 26, 2009

(51) Int. Cl.
*G06K 9/00* (2006.01)
(52) U.S. Cl. ........................ 382/162; 382/103
(58) Field of Classification Search .......... 382/162–167, 382/103, 107, 117–118, 224–225, 168, 172, 382/173, 232; 348/169; 375/240.01
See application file for complete search history.

(56) References Cited

U.S. PATENT DOCUMENTS

| | | | |
|---|---|---|---|
| 6,920,237 B2 * | 7/2005 | Chen et al. | 382/117 |
| 7,218,759 B1 * | 5/2007 | Ho et al. | 382/118 |
| 7,352,880 B2 * | 4/2008 | Kim et al. | 382/103 |
| 7,444,022 B2 * | 10/2008 | Paschalakis | 382/224 |
| 2008/0181459 A1 * | 7/2008 | Martin et al. | 382/103 |
| 2010/0322300 A1 * | 12/2010 | Li et al. | 375/240.01 |

OTHER PUBLICATIONS

Bilmes, J., A Gentle Tutorial of the Algorithm and its Application to Parameter Estimation for Gaussian Mixture and Hidden Markov Models, Technical Report, University of Berkeley, 1998.

Duda, Richard O., Hart, Peter E., Stork, David G., Chapters 2 and 3, Pattern Classification, Oct. 2000, vol. Second Edition, pp. 20-83 and 84-160.

Viola, P., Jones, Michael J., Robust Real-Time Face Detection, International Journal of Computer Vision, 2004, vol. 57, Issue 2, pp. 137-154.

* cited by examiner

*Primary Examiner* — Ishrat I Sherali

(57) ABSTRACT

Systems and methods for motion detection of human skin within temporally adjacent electronic images are provided. Motion detection is accomplished by analyzing the color values of selected pixels within the electronic images represented in CbCr color space. Histogram distributions which represent skin colors and non-skin colors in CbCr color space are modeled in order to provide likelihoods that a selected color value appears within the histogram distributions. Posterior skin probability values, indicating the probability that a selected pixel having a given CbCr color value represents human skin, are calculated from these likelihoods. For each of the selected pixels, an intensity difference of the pixel between the electronic images is compared to an adaptive intensity threshold which is a function of the posterior skin probability in order to determine whether the pixel is in motion.

25 Claims, 6 Drawing Sheets

SYSTEM AND METHOD FOR HUMAN HAND MOTION DETECTION BY SKIN COLOR PREDICTION

BACKGROUND OF THE INVENTION

1. Field of the Invention

Embodiments of the disclosure relate to systems and methods for detecting the motion of human skin within electronic images and, in particular, systems and methods which detect the motion of human skin by analysis of pixel colors in the CbCr color space.

2. Description of the Related Art

The detection of human motion within video images is a topic of importance within the field of computer vision. Through the use of vision-based motion detection techniques, computer systems may be developed which are capable of identifying the movements of human users from captured video. These movements may be further combined with programmed logic in order to interpret the user's intentions and to provide next generation computer interfaces.

Motion detection can be relatively computing intensive, however. For example, color video is typically provided using color models which employ three parameters, such as Red-Green-Blue (RGB), Cyan-Magenta-Yellow-Key (CYMK), Hue-Saturation-Value (HSV), and Luma-Blue Chroma-Red Chroma (YCbCr). Performing the calculations necessary to accurately detect human motion in three color dimensions requires relatively sophisticated, costly computing systems. These expensive computing systems are not feasible for use with consumer computing products, such as home computers, video games, and intelligent televisions. And while less sophisticated, cheaper computing systems may be employed for motion detection, these less sophisticated systems present less accurate motion detection, rendering these systems unacceptable for use in mass-market consumer products, which require inexpensive motion detection systems which are both fast and accurate.

From the forgoing, then, there exists a continued need for systems and methods of human motion detection which provide accurate, fast detection at lower complexity and cost.

SUMMARY

In one embodiment, a method of detecting whether a selected pixel in an electronic image F(t), having a pixel color, represents human skin in motion is provided. The method comprises calculating a first probability, $P_1$, indicating a likelihood that the color of the selected pixel appears within a first distribution of pixel colors observed in human skin. The color of the selected pixel and the first distribution of pixel colors are represented in the CbCr color space. The method further comprises calculating a second probability, $P_2$, indicating a likelihood that the selected pixel color appears within a second distribution of pixel colors that are observed outside of human skin, where the second distribution of pixel colors are represented in the CbCr color space. The method additionally comprises calculating a third probability, $P_K$, indicating a probability that the selected pixel represents human skin, where $P_K$ is a function of $P_1$ and $P_2$. The selected pixel is determined to represent human skin in motion if an intensity difference, I, between the intensities of the selected pixel within F(t) and a temporally adjacent electronic image F(t−Δt) is greater than a threshold intensity value, T, which is a function of $P_K$.

In another embodiment, a system for identifying the motion of a selected pixel having a pixel color within a plurality of temporally adjacent electronic images is provided. The system comprises a skin likelihood calculator that employs a skin color model which models a first histogram distribution of pixel colors representing human skin in order to calculate a skin likelihood, $P_1$, representing a likelihood of observing the color of the selected pixel in human skin. The skin likelihood calculator further employs a non-skin color model which models a second histogram distribution of pixel colors which do not represent human skin in order to calculate a non-skin likelihood, $P_2$, representing a likelihood of observing the color of the selected pixel outside of human skin where the pixel color of the selected pixel and the first and second histogram distributions are represented in the CbCr color space. The system also comprises a posterior probability calculator which employs a Bayesian equation, the color of the selected pixel, and the skin and non-skin likelihoods $P_1$ and $P_2$ in order to calculate a probability that the selected pixel represents human skin. The system additionally comprises a motion detection engine which determines that the selected pixel represents human skin in motion if a difference in intensity of the selected pixel between a first electronic image and a second electronic image selected from the plurality of electronic images is greater than a threshold intensity value, T, where T is a function of $P_K$.

In a further embodiment, a method of detecting the motion of human skin within a video is provided. The method comprises receiving at least a first video frame and a second video frame which are temporally adjacent to one another. The method also comprises selecting a pixel from the first video frame, the pixel having a pixel color. The method further comprises calculating a skin probability, $P_K$ that the selected pixel represents human skin, where the skin probability $P_K$ is a function of a likelihood of observing the selected pixel's color in a first plurality of pixels representing human skin and a likelihood of observing the selected pixel's color in a second plurality of pixels not representing human skin, where the pixel color of the selected pixel and the first and second plurality of pixels are represented in the CbCr color space. The method additionally comprises comparing an intensity difference, I, between the selected pixel within the first and second video frames to a threshold intensity, T, comprising a function of $P_K$. The selected pixel is considered to represent the motion of human skin if the value of I is greater than T.

In an additional embodiment, a system for detecting human motion within a video is provided. The system comprises a video source capable of transmitting a plurality of video frames. The system further comprises a motion evaluation system which receives at least a first and a second temporally adjacent video frames from the video source, the motion evaluation system comprising a skin probability calculator and a motion detection engine. The skin probability calculator calculates a posterior skin probability, $P_K$, for at least one selected pixel within the plurality of video frames represents human skin. The posterior skin probability $P_K$ comprises a probability of observing the pixel color of the selected pixel in a first histogram distribution of pixel colors representing human skin, $P_S$. The posterior skin probability $P_K$ also comprises a probability of observing the pixel color of the selected pixel in a second histogram distribution of pixel colors which do not represent human skin, $P_{NS}$. The pixel color of the selected pixel and the first and second histogram distributions are represented in the CbCr color space. The motion detection engine also determines that the selected pixel is in motion if an intensity difference of the selected pixel between the first electronic image and the second electronic image is greater than a threshold intensity, T, which comprises a function of $P_K$.

DETAILED DESCRIPTION

Embodiments of the present disclosure provide systems and methods for motion detection of human skin within a plurality of temporally adjacent electronic images, such as video frames. In one embodiment, motion detection is accomplished by analyzing the color values of selected pixels within the plurality of electronic images in the two-dimensional (2-D) CbCr color space. In one embodiment, posterior skin probability values indicating the probability that pixel having a given CbCr color value represents human skin are calculated. In another aspect, a determination as to whether a selected pixel is in motion and represents human skin is made by calculating an intensity difference of the pixel between temporally adjacent images and comparing the difference to an adaptive intensity threshold which is a function of the posterior skin probability in order.

In another embodiment, posterior skin probabilities are calculated using the Bayesian Equation and likelihood probabilities that a given color is found in human skin and likelihood probabilities that a given color is found in anything that is not human skin. The likelihood probabilities are determined according to models of CbCr histogram distributions of colors found in human skin and colors which are found in objects that are not human skin that provide likelihood probabilities. In certain embodiments, the models comprise single Gaussian and Gaussian mixture models of the CbCr histogram distributions. Beneficially, the skin color distribution is well-clustered in CbCr color space and can be accurately modeled by Gaussian Mixture Model. Furthermore, the computing times required to perform skin color detection are reduced, as compared with similar calculations performed using pixel colors represented in three-dimensional color spaces such as RGB space. These and other aspects of the present disclosure are discussed in detail below.

Figure 1:
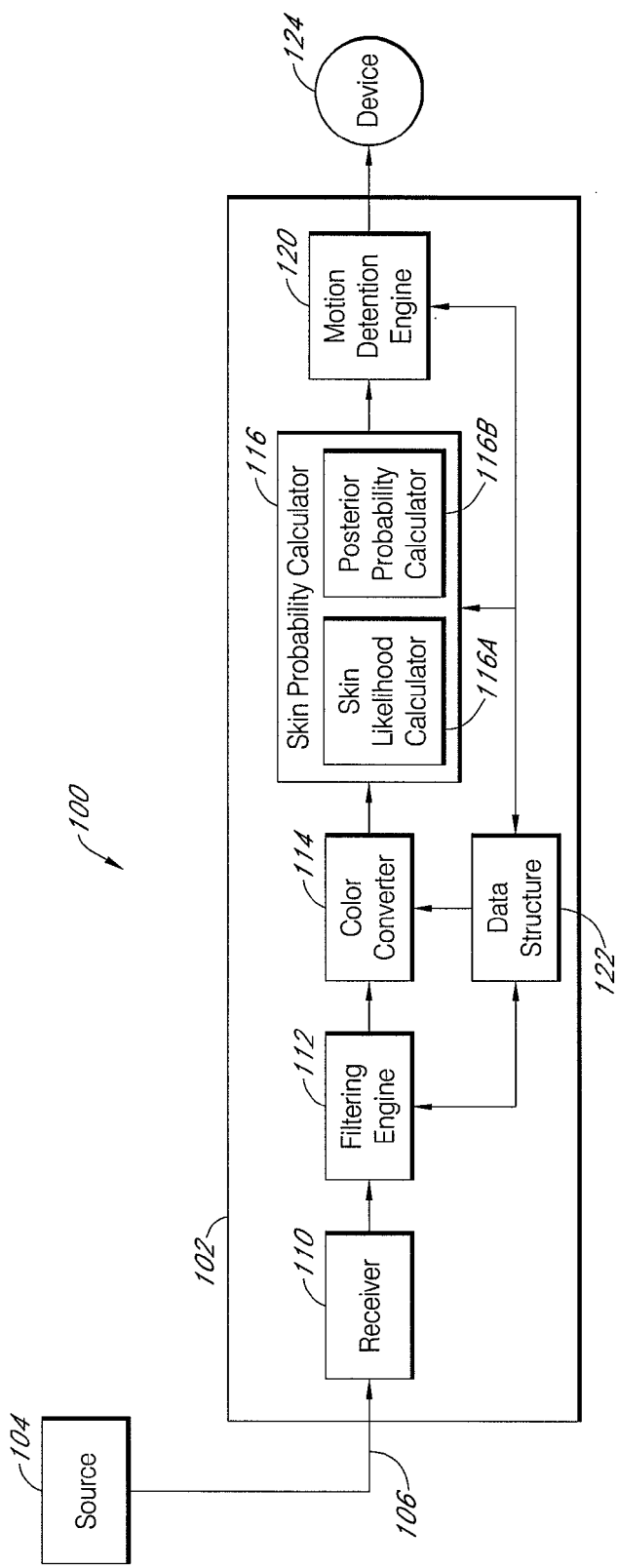
FIG. 1 is a block diagram of one embodiment of a system for motion detection of human skin using pixel colors expressed in the CbCr color system.

FIG. 1 illustrates one embodiment of a system 100 for the detection of human skin motion within a plurality of electronic images. The system 100 comprises a source 104 which transmits the plurality of electronic images to a motion evaluation system 102 through a communications link 106. The source 104, motion evaluation system 102, and communications link 106 may be combined within a single unit or separate units. In certain embodiments, the system 100 may further comprise at least a portion of a personal computer, a television set top box, a portable electronic device, a television, a video game console, and combinations thereof. In some embodiments, one or more of the elements of the motion evaluation system 102 of FIG. 1 may be rearranged and/or combined. The elements may be implemented by hardware, software, firmware, middleware, microcode, or any combination thereof.

In one embodiment, the motion evaluation system 102 examines a plurality of selected pixels within the plurality of electronic images received from the source 104 and determines whether the plurality of pixels represent human skin in motion. In another embodiment, the determination of the motion detection system 102 may be output to a device 124 which makes use of this motion information. In alternative embodiments, the determination may be stored for future output by the system 100. In one embodiment, the device 124 may comprise a computing device having a user interface. Thus, for example, the motion determination of the motion detection system 100 may be used in order to control at least a portion of the functions of the user interface 124.

In certain embodiments, the motion evaluation system 102 may also perform a filtering operation on the plurality of selected pixels, prior to this motion detection determination, in order to remove selected pixels from further skin color consideration. As, discussed below, the pixels selected for removal may comprise reddish-colored pixels and their removal may significantly increase the number of analyzed pixels correctly identified as human skin.

The source 104, in one embodiment, comprises a source of a plurality of electronic images, such as a plurality of live electronic images or a plurality of previously recorded electronic images. Examples of live image sources include, but are not limited to, video cameras. Examples of stored image sources may include, but are not limited to, memory devices such as fixed disk drives, flash drives, removable media, such as magnetic tapes, CDs, DVDs, and combinations thereof. In one embodiment, the plurality of electronic images may comprise a plurality of pictures, video frames, and combinations thereof. In another embodiment, frames may comprise either frames or fields of a progressive video signal or frames or fields of an interlaced video signal. In certain embodiments, the video source 104 may provide the plurality of electronic images in the form of luminance and chrominance, in the form of individual color intensities such as red, green and blue, and combinations thereof.

In further embodiments, the plurality of electronic images may comprise temporally adjacent pictures or video frames. In one embodiment, temporally adjacent frames may comprise frames which are separated by a selected time interval. The selected time interval may be fixed or variable, as necessary. In other embodiments, temporally adjacent frames may be separated from one another by a selected number of frames. The selected number of frames may also be fixed or variable, as necessary.

The communications link 106 may comprise wire or wireless communications mechanisms. Examples of such communications mechanisms may include, but are not limited to, Local Area Networks (LANs), Wide Area Networks (WANs), intranets, extranets, the Internet, power lines, fiber-optic systems, telephone lines, and cable.

The motion evaluation system 102, in one embodiment, comprises a receiver 110, a color convertor 114, a skin probability calculator 116, a motion detection engine 120, and at least one data structure 122. In alternative embodiments, the motion evaluation system 102 may further comprise a filtering engine 112. In additional embodiments, the motion evaluation system 102 may further comprise a plurality of processors and memory. Examples of processors may include, but are not limited to, general purpose processors, digital signal processors, application specific hardware processors, and combinations thereof. Examples of memory may include, for example, one or more of integrated circuits or disk based storage or any readable and writeable random access memory device. The plurality of processors may be coupled to the memory and the other elements of the motion detection system in order to perform the various actions of the other elements. It may be understood that motion evaluation system 102 may further include additional or fewer components, as necessary.

In one embodiment, the receiver 110 of the motion evaluation system 102 receives the plurality of electronic images over the communications link 106. For example, the receiver 110 may receive at least a first electronic image and a second electronic image which are temporally adjacent. The receiver 110 may further perform a plurality of operations on the received images. Such operations may include, but are not limited to, compression, decompression, reformatting, encoding and decoding.

The filtering engine 112 is configured to identify problematic pixels. As discussed in greater detail below with respect to FIG. 6, pixels which possess R/G values (as given by the pixel color in RGB color space) greater than a threshold R/G value have a high likelihood of being misclassified as human skin by the skin probability calculator 116. Such misclassifications may result in non-skin pixels being mistakenly identified as skin pixels in motion by the system 102. Therefore, in certain embodiments, the filtering engine 112 examines the R/G ratio of pixels for which a motion determination is to be made and, if the R/G value for a pixel is greater than the threshold R/G value, the motion detection engine 120 considers the pixel not to be in motion.

The color convertor 114 is configured to convert the pixels to be analyzed for motion detection from a first color space to a second color space. Examples of such color spaces may include, but are not limited to, RGB, HSV, YPbPr, YCbCr, and CbCr. In one embodiment, the color converter 114 converts pixel color values from RGB to CbCr color spaces.

In one embodiment, the skin probability calculator 116 comprises a skin likelihood calculator 116A, which calculates the skin and non-skin likelihoods and a posterior probability calculator 116B, which calculates the skin color probabilities from the skin and non-skin likelihoods and the skin and non-skin prior probabilities. The skin probability calculator 116 is configured to calculate skin color probabilities. The skin color probabilities provide a measure of the probability that a pixel, having a given pixel color, selected from an electronic image received from the source 104, does or does not represent human skin. In certain embodiments, skin color probabilities are calculated by the skin probability calculator 116 using the Bayesian equation. In this context, the skin color probabilities may also be referred to as posterior skin probabilities. The Bayesian equation provides a mathematical approach to determine a probability that a hypothesis (for example, the hypothesis that a selected pixel with a given color value represents human skin) is true in light of already observed data (for example, color values from a larger training dataset). In certain embodiments, the skin color probabilities are calculated from the Bayesian equation using skin and non-skin likelihoods and prior probabilities of skin and non-skin color.

The skin likelihood calculator 116A calculator employs models of training data to calculate the skin and non-skin likelihood probabilities. In one embodiment, the skin likelihood probability is a measure of the probability of observing a given color in human skin and is obtained from a skin color training data set. In another embodiment, the non-skin likelihood probability is a measure of the probability of observing a given color in anything which is not human skin and is obtained from a non-skin color training data set. Thus, in one embodiment, the skin color training data set may comprise a histogram distribution of CbCr colors observed in human skin. In another embodiment, the non-skin training data set may comprise a histogram distribution of CbCr colors observed in anything which is not human skin. As discussed below, skin and non-skin training data sets may be obtained by sorting at least a portion of the pixels of a plurality of electronic images by whether the pixels represent human skin or do not represent human skin.

In one embodiment, the models of the skin and non-skin training data sets comprise statistical models that approximate the CbCr color distributions of the training data sets. Beneficially, these statistical models may be described by a relatively small number of statistical parameters, providing a relatively easy mechanism by which to represent the CbCr color distributions of the training data sets. In one embodiment, the skin and non-skin training data sets may be modeled using a plurality of Gaussian distributions. In further embodiments, the CbCr color histogram distribution of the skin training data set may be modeled by a Gaussian Mixture Model. In an additional embodiment, the CbCr pixel color distribution of the non-skin training data set may be modeled by a Single Gaussian Model. This modeling, in certain embodiments, may be performed offline and the modeling parameters may be retrieved by the system 102 when needed for calculations. For example, the modeling parameters may be stored in the system 102, such as in data structure 122, or retrieved remotely from outside the system 102.

In certain embodiments, the skin and non-skin prior probabilities may also be obtained from the skin and non-skin training data sets. The skin and non-skin prior probabilities, respectively, represent the probabilities that a given pixel color does or does not represent skin, without any knowledge about the pixel color. For example, the prior skin probability may comprise the fraction of pixels within both the skin and non-skin training data sets that are skin color pixels. Similarly, the prior non-skin probability may comprise the fraction of pixels from the within both the skin and non-skin training data sets that are not skin color pixels. The prior probabilities may also be retrieved by the skin probability calculator 116 when needed. For example, the prior probabilities may be stored in the system 102, such as in data structure 122, or retrieved remotely from outside the system 102.

Whether the selected pixel is determined to represent a skin pixel in motion within a currently examined electronic image is determined by the motion detection engine 120. In one embodiment, the motion detection engine 120 calculates an intensity difference of the selected pixel between the currently examined frame and the temporally adjacent frame and compares the calculated intensity value against a threshold value. In certain embodiments, the threshold value is a function of the posterior skin probability and is referred to herein as an adaptive threshold. If the intensity is greater than the adaptive threshold, the pixel is determined to be in motion. Conversely, if the intensity is less than the adaptive threshold, the pixel is determined not to be in motion.

The adaptive threshold varies with the posterior skin probability such that, as the posterior skin probability increases, the threshold intensity value decreases. In certain embodiments, a linear relationship exists between the adaptive threshold intensity value and the posterior skin probability. This variation reflects that the system is more sensitive to human skin regions when detecting motion. For example, the adaptive threshold intensity value is lowered under circumstances where there is believed to be a high likelihood that the selected pixel represents human skin (high posterior probability). Thus, lower intensity difference values are required under these circumstances in order for the system 100 to determine that the pixel is in motion.

The motion evaluation system 102 may further comprise a data structure 122 in communication with at least one of elements 112, 114, 116, 120 of the system 102. The data structure may be employed to store and/or retrieve a plurality of information used by the motion evaluation system 102 for motion detection. In one embodiment, the data structure 122 may store the results of calculations of the elements 112, 114, 116, and 120 of the motion evaluation system 102. For example, the data structure 122 maintain a record of the pixels within the plurality of electronic images received by the system 102 which are to be excluded from consideration, as determined by the filtering engine 112. In another example, the data structure 122 may maintain a record of calculated likelihood probabilities, prior probabilities, and posterior probabilities a selected pixel. In a further example, the data structure 122 may maintain a record of the motion determinations of the motion detection engine 120.

Figure 2:
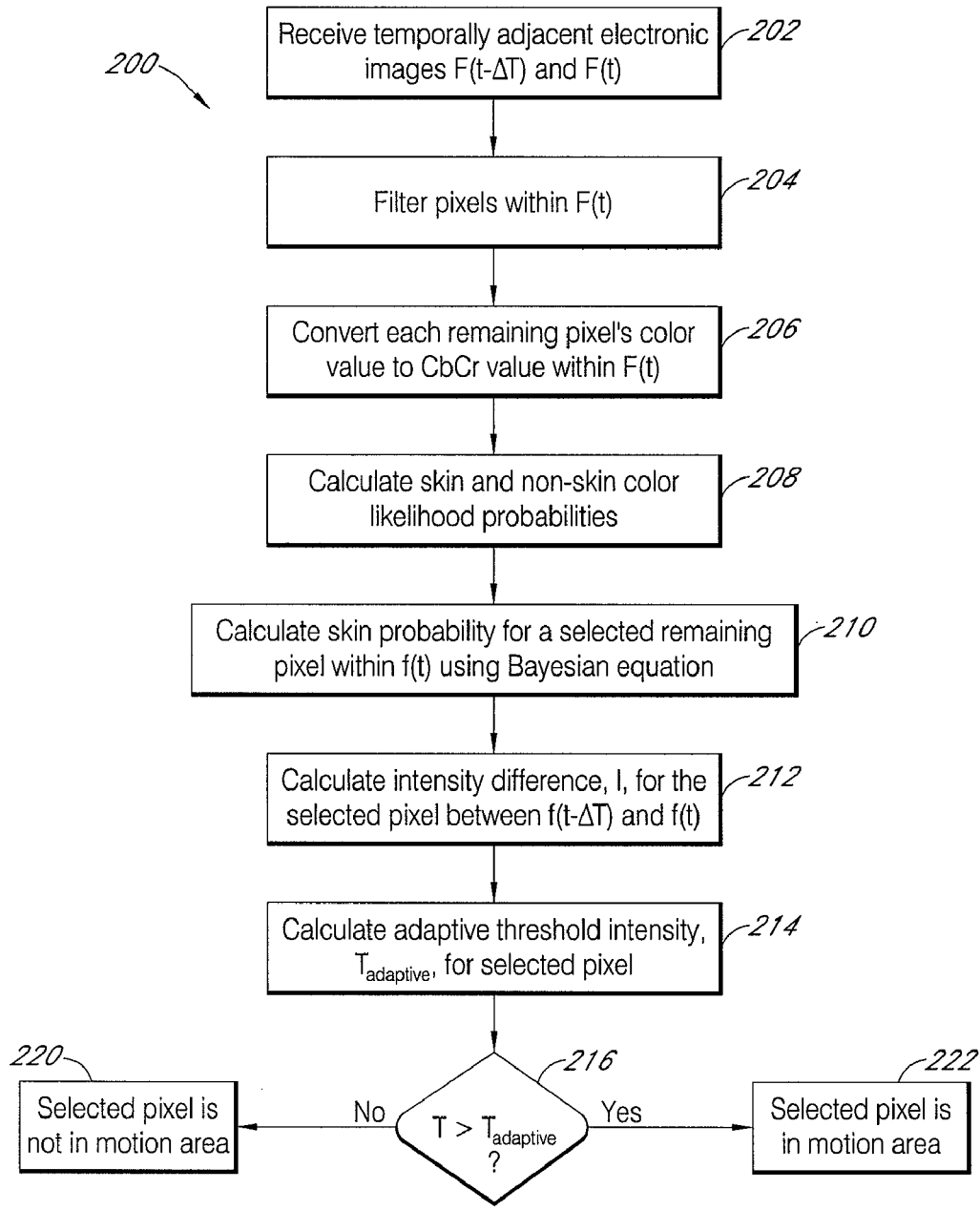
FIG. 2 is a flowchart illustrating one embodiment of a method of motion detection of human skin using the system of FIG. 1.
Figure 3:
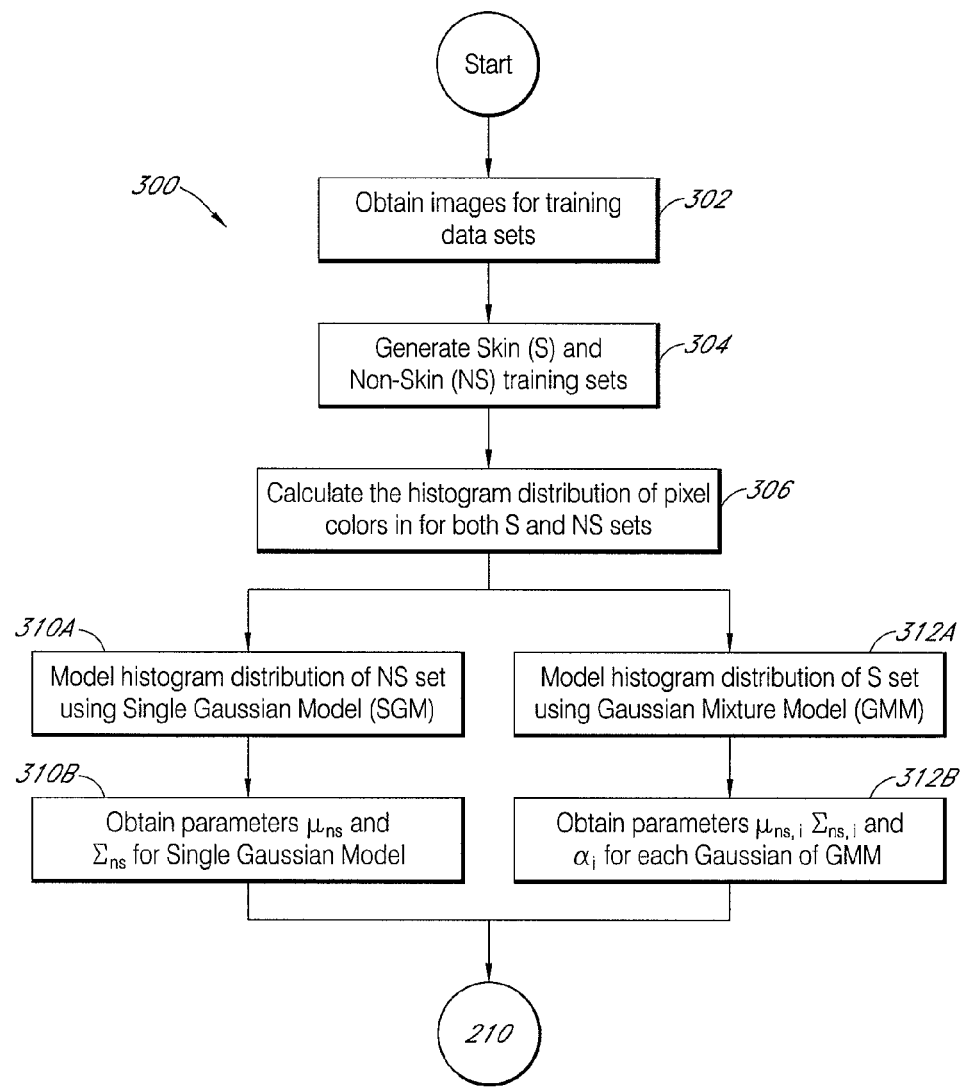
FIG. 3 illustrates one embodiment of a method of training a color probability calculator of the system of FIG. 1.

FIGS. 2 and 3 illustrate embodiments of methods 200 and 300 for detecting the motion of a plurality of pixels representing human skin within temporally adjacent electronic images. In one embodiment, the electronic images may comprise temporally adjacent frames within a video sequence, F(t−Δt) and F(t), where t is time and Δt represents a selected time increment. In alternative embodiments, F(t−Δt) and F(t) may represent frames within a video sequence separated by a selected number of frames. F(t−Δt) may further occur temporally ahead or behind F(t). It may be understood that the methods 200, 300 of FIGS. 2 and 3 may include additional or fewer blocks and the blocks may be performed in a different order than illustrated.

The method 200 begins in Block 202 with the receipt of a plurality of electronic images from the video source 106 by the receiver 110. For example, the plurality of electronic images may comprise a current frame F(t) and a temporally adjacent frame F(t−Δt). Optionally, in Block 204, the pixels within at least the current frame F(t) are filtered so as to reduce the number of misclassified pixels, as discussed below with respect to FIG. 6. In Block 206, the plurality of pixels and their corresponding pixels in F(t−Δt) are provided to the color converter 114.

The color values, in CbCr space, of the plurality of pixels are used to calculate the skin color and non-skin color likelihoods in Block 208. In one embodiment, statistical skin and non-skin color models are fit to the histogram distributions of skin color and non-skin color training data sets, respectively, to provide statistical parameters which approximate the histogram distributions. Such modeling may be performed in advance of or concurrent with the method 200. In this manner, input of a selected pixel value, along with the appropriate statistical parameters, into the skin color or non skin color models yields the skin color and non-skin color likelihood probabilities, respectively for that pixel value.

One embodiment of a training method 300 for determination of the statistical parameters employed in the likelihood calculations is illustrated in FIG. 3. In Block 302, a plurality of training images are obtained. In one embodiment, the training images may be obtained from the source 106. In another embodiment, the training images may be collected from the Internet.

Figure 4:
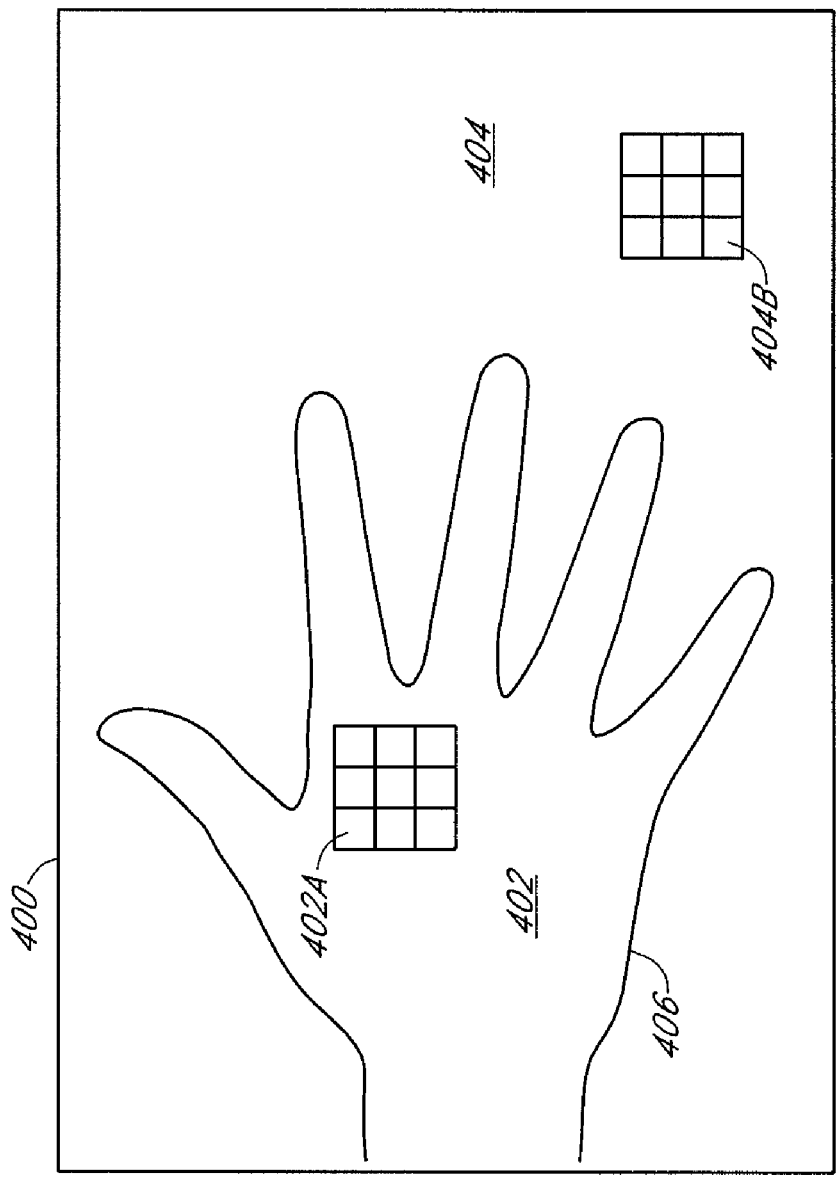
FIG. 4 is a schematic which illustrates one embodiment of a plurality of electronic images which may be used to train the color probability calculator of the system of FIG. 1.

In one embodiment, a plurality of training images 400 may comprise images representing human skin 402 (FIG. 4). For example, the human skin may comprise at least a portion of human body parts, such hands 406. In another embodiment, the training images 400 may comprise regions 404 which do not represent of human skin 402. In additional embodiments, training images 400 may comprise combinations of skin and non-skin regions 402, 402. In alternative embodiments, at least a portion of the training images 400 may consist only of electronic images which do not represent of human skin. In additional embodiments, at least a portion of the training images 400 may consist only of electronic images which do not represent human skin.

Upon obtaining the histogram distribution of training samples, the pixels of the training images 400 are labeled into a skin training set (S) and non-skin training set (NS) in Block 304. The skin training set (S), in one embodiment comprises pixels which represent human skin, for example, pixels 402A of FIG. 4. Similarly, the non-skin training set (NS) comprises pixels which do not represent human skin, such as pixels 404B. In one embodiment, the pixel labeling process is performed manually by humans. The labeled pixels may be further used to generate a color histogram distribution for each training set, where $N_S$ is the histogram distribution of the skin training set and $N_{NS}$ is the histogram distribution of the non-skin training set (Block 306).

Through this labeling process, the skin and non-skin color prior probabilities may also be calculated. In one aspect, the total number of pixels within each of the training sets S and NS may be counted. In another aspect, by taking the ratio of the number of pixels within the training set S to the total number of pixels within both the training sets S and NS, the prior probability of skin color, $f_S$ may be calculated. In a further aspect, by taking the ratio of the number of pixels within the training set NS to the total number of pixels within the training sets S and NS, the prior probability of non skin color, $f_{NS}$, may also be calculated.

Having generated the histogram distributions $N_S$ and $N_{NS}$ from the training images, the two distributions may be statistically modeled. Beneficially, statistical modeling of the distributions provides a mathematical form which allows the skin and non-skin likelihood probabilities to be determined from the histogram distributions upon input of a single parameter, a selected pixel color, in CbCr color space. In one embodiment, the skin color histogram distribution, $N_S$, is modeled using a Gaussian Mixture Model (GMM). In another embodiment, the non-skin color histogram distribution, $N_{NS}$, is modeled using a Single Gaussian Model (SGM).

In one embodiment, $N_{NS}$ is modeled in Block 310A using a Single Gaussian Model, $P_{NS}$, of the form:

$$P_{NS}(x \mid \mu_{NS}, \sum\nolimits_{NS}) = \frac{1}{(2\pi)^{p/2} |\sum_{NS}|^{1/2}} \exp\left(-\frac{1}{2}(x-\mu_{NS})^T \sum\nolimits_{NS}^{-1} (x-\mu_{NS})\right) \quad \text{(Eq. 1)}$$

where x is the pixel color in CbCr color space, $\mu_{NS}$ is the mean of the Gaussian distribution $P_{NS}$, $\Sigma_{NS}$ is the covariant of Gaussian distribution $P_{NS}$, $|\Sigma_{NS}|$ is the determinant of $\Sigma_{NS}$, p is an integer representing the dimensionality of the color space of x, and $(x-\mu_{NS})^T$ is the transpose of the matrix $(x-\mu_{NS})$.

The values $\mu_{NS}$ and $\Sigma_{NS}$ represent fitting parameters of the Gaussian distribution $P_{NS}$ to the distribution $N_{NS}$. In one embodiment, $\mu_{NS}$ and $\Sigma_{NS}$ are calculated from the following equations in Block 310B:

$$\mu_{NS} = \frac{1}{n}\sum_{j=1}^{n} x_j \qquad (Eq.\ 2)$$

$$\Sigma_{NS} = \frac{1}{n-1}\sum_{j=1}^{n} (x_j - \mu_{NS})(x_j - \mu_{NS})^T \qquad (Eq.\ 3)$$

where $x_j$ is the $j^{th}$ pixel within the NS training set and where n is an integer representing the number of pixels within the NS training set.

In further embodiments, the $N_S$ distribution may be modeled by a Gaussian Mixture Model using Equations 4-6 in Block 312A. The modeling of Block 312A is performed using a weighted mixture of Gaussian distributions, $P_S$, rather than a single Gaussian distribution:

$$P_S(x \mid \mu_{S,i}, \Sigma_{S,i}) = \sum_{i=1}^{M} \alpha_i p_i(x \mid \mu_{S,i}, \Sigma_{S,i}) \qquad (Eq.\ 4)$$

$$p_i(x \mid \mu_{S,i}, \Sigma_{S,i}) = \frac{1}{(2\pi)^{p/2}|\Sigma_{S,i}|^{1/2}} \exp\left(-\frac{1}{2}(x-\mu_{S,i})^T \Sigma_{S,i}^{-1}(x-\mu_{S,i})\right) \qquad (Eq.\ 5)$$

$$\sum_{i=1}^{M} \alpha_i = 1 \qquad (Eq.\ 6)$$

where x is the pixel color, in CbCr color space, M is an integer representing the total number of Gaussian distributions comprising $P_S$, $p_i$ is the $i^{th}$ Gaussian distribution of $P_S$, $\mu_{S,i}$ is the mean of $p_i$, $\Sigma_{S,i}$ is the covariant of $p_i$, $|\Sigma_{S,i}|$ is the determinant of $\Sigma_{S,i}$, p is an integer representing the dimensionality of the color space of x, $(x-\mu_{S,i})^T$ is the transpose of the matrix $(x-\mu_{S,i})$, and $\alpha_i$ is a weighting factor of $p_i$.

In one embodiment, $\mu_{S,i}$ and $\Sigma_{S,i}$ are given by:

$$\mu_{S,i} = \frac{1}{m}\sum_{j=1}^{m} x_j \qquad (Eq.\ 7)$$

$$\Sigma_{S,i} = \frac{1}{m-1}\sum_{j=1}^{m} (x_j - \mu_i)(x_j - \mu_i)^T \qquad (Eq.\ 8)$$

where m is an integer representing the number of pixels in Gaussian i of $N_S$, $(x_j-\mu_i)^T$ is the transpose of the matrix $(x_j-\mu_i)$ and $x_j$ is the $j^{th}$ pixel within the cluster i in S training set.

The fitting parameters $\mu_{S,i}$ and $\Sigma_{i,S}$ may be obtained, in certain embodiments, from an Expectation-Maximization (EM) process. A description of one embodiment of the EM process is described in detail in "A Gentle Tutorial on the EM Algorithm and its Application to Parameter Estimation for Gaussian Mixture and Hidden Markov Models", Technical report, U.C. Berkeley, ICSI-TR-97-021, by Jeff Bilmes, which includes a simplified derivation of the EM equations for Gaussian Mixtures and Gaussian Mixture Hidden Markov Models.

Table I illustrates one non-limiting example of parameters $\mu_{NS}$, $\mu_{S,i}$, $\Sigma_{NS}$, $\Sigma_{S,i}$, and $\alpha_i$ obtained from one embodiment of a training data set. In one embodiment, two Gaussian distributions are employed to model $N_S$.

TABLE I

Training parameters obtained from statistical modeling of $N_S$ and $N_{NS}$

| | Mean, μ | Covariance, Σ | Weight, α |
|---|---|---|---|
| Skin Gaussian 1 | 101.5, 158.7 | 102.8, −47.7, −47.7, 101.1 | 0.61 |
| Skin Gaussian 2 | 113.8, 144.4 | 57.6, −52.6, −52.6, 86.1 | 0.39 |
| Non-skin Gaussian | 125.4, 129.6 | 199.0, −123.6, −123.6, 170.7 | 1 |

In Block 210 of the method 200, a posterior skin probability value, $P_K$, is calculated for plurality of pixels in F(t) for which a motion determination is to be made. As discussed above, $P_K$ represents the probability that a pixel having a given color represents human skin. In one embodiment, for a selected pixel having a color value x', the color value in CbCr color space is input to the Bayesian Equation (Equation 9), along with the likelihood probabilities $P_S$ and $P_{NS}(x')$ for the skin and non-skin prior probabilities of color value x', and $f_S$ and $f_{NS}$, respectively:

$$P_K(x') = \frac{P_S(x')f_S}{P_S(x')f_S + P_{NS}(x')f_{NS}} \qquad (Eq.\ 9)$$

In Blocks 212-222 of the method 200, calculations are performed by the motion detection engine 120 to assess whether a selected pixel is in motion, in light of the calculated posterior skin probability. In Block 212, an intensity difference of the selected pixel is calculated between the selected pixel in frame F(t−Δt) and F(t).

In block 214, the adaptive threshold intensity for the selected pixel is calculated. In one embodiment, the intensity threshold, $T_{adaptive}$, is calculated according to the expression:

$$T_{adaptive} = (T_1 - T_2)P_K + T_2 \qquad (Eq.\ 10)$$

where $T_1$ and $T_2$ are selected intensity values and $T_2$ is greater than $T_1$. In one embodiment, the values of $T_1$ and $T_2$ are selected based upon the signal to noise ratio of the input video.

The calculated intensity difference is compared to the threshold intensity $T_{adaptive}$ so as to determine whether the selected pixel is in motion. If the intensity difference is less than the threshold, $T_{adaptive}$, the selected pixel is determined not to be in motion (Block 220). If the intensity difference is greater than the threshold, the selected pixel is determined to be in motion (Block 222)

Figure 5:
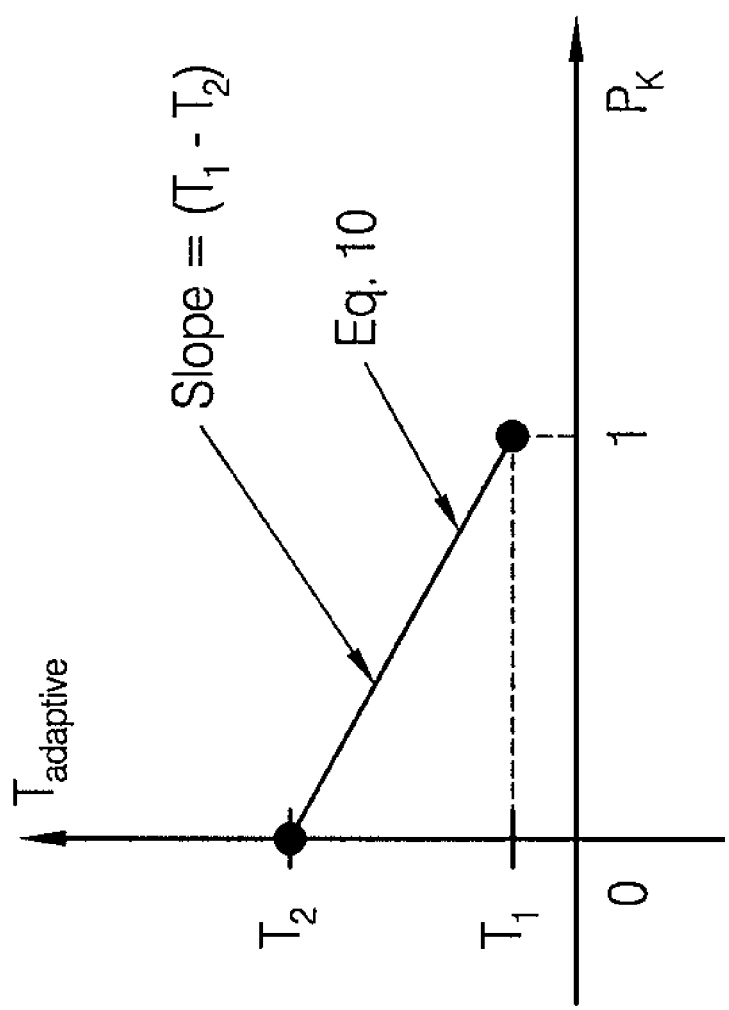
FIG. 5 is a plot of one embodiment of an intensity threshold employed by a motion detection engine of the system of FIG. 1.

The functional form of $T_{adaptive}$ is designed so as to provide the evaluation system 102 with increased sensitivity to human skin regions than non-skin regions. For example, as illustrated in Equation 10 and the corresponding plot of FIG. 5, Equation 10 follows a substantially linear relationship with $P_K$, characterized by a slope of about $(T_1-T_2)$ and y-axis intercept of about $T_2$. Thus, Equation 10 provides that the adaptive threshold intensity, $T_{adaptive}$, decreases as the probability $P_K$ increases. Beneficially, by lowering the threshold when the skin probability is high, a lower intensity difference is required in order to determine that the pixel is in motion, meaning that the evaluation system 102 is more likely to determine that the selected pixel is in motion.

In order to further improve the quality of the skin color detection provided by the skin probability calculator 116, a filtering operation may be further performed in Block 204, prior to calculation of the color probability. The filtering operation is based upon the observation that some reddish color pixels are wrongly classified as skin color using the skin probability calculator 116 implemented in CbCr space in Block 208. These reddish pixels can be easily filtered out by a nonlinear filter in RGB space.

In one embodiment, the filtering operation performed in Block 204 may comprise a non-linear filtering operation performed by the filtering engine 112 on all pixels in the current frame F(t). In one embodiment, a ratio of the red color to the green color, R/G, is calculated for each pixel within F(t), as represented in RGB space. In another embodiment, if the R/G of a pixel is greater than a selected threshold value, the $P_K$ value of that pixel is set to about zero. Beneficially, then, such pixels are unlikely to be determined to be in motion as the adaptive threshold is very high. Thus, the filtering operation substantially inhibits the motion determination system 102 from identifying pixels with high R/G values as human skin pixels in motion and provides a significant increase in classification accuracy using the method 200.

Figure 6:
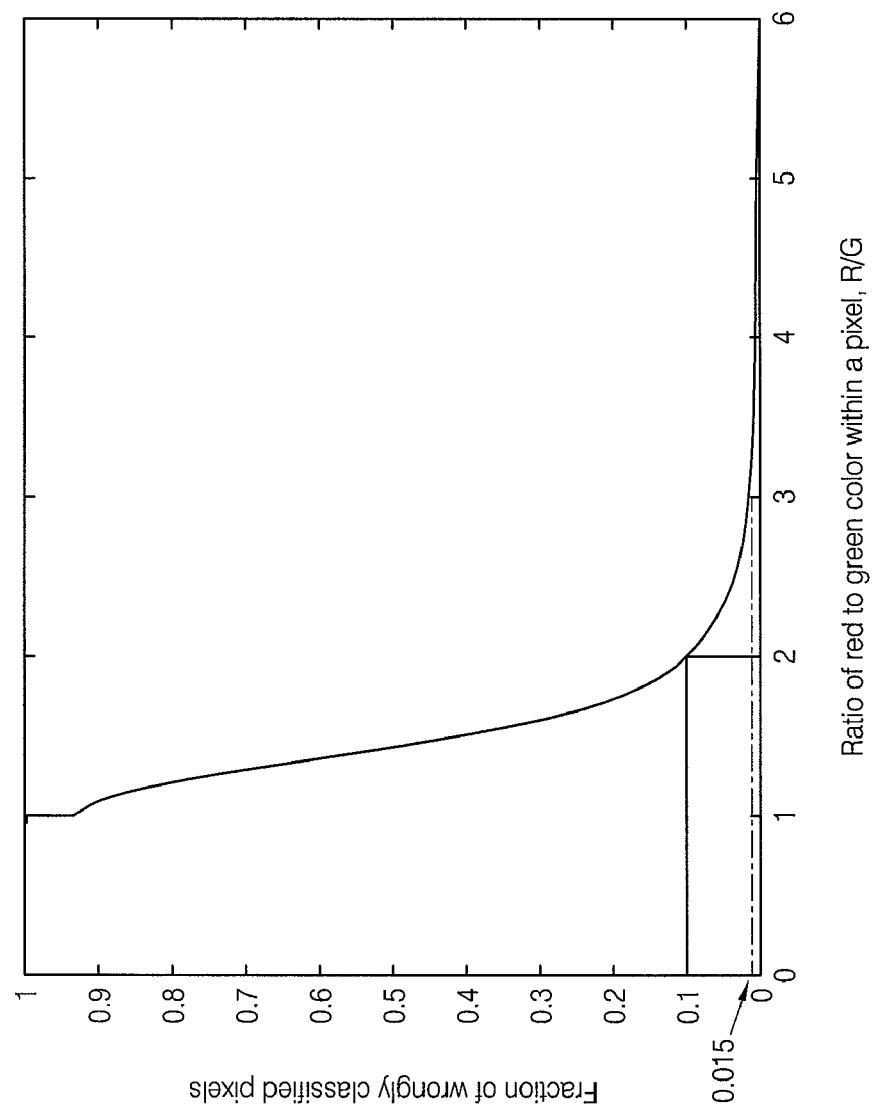
FIG. 6 is a plot of a relationship between a percentage of pixels incorrectly classified by the system and the R/G values of the pixels, as represented in the RGB color space.

In one embodiment, the selected value for R/G may be determined from the training dataset. For each pixel within the training data set, an R/G value may be calculated. Furthermore, the percentage of skin color pixels within the skin color training data set whose R/G is greater than this R/G value can be calculated. This is shown as a function of incorrect classification percentage according to the R/G value change (FIG. 6). With such relationship, an R/G threshold for the filtering engine 112 may be selected.

As illustrated in FIG. 6, increasing the selected value of R/G decreases the percentage of wrongly classified pixels. For example, for pixels possessing R/G of approximately 1, the fraction of wrongly classified pixels is about 1, or 100%. As R/G increases to about 2, the fraction of wrongly classified pixels is reduced to approximately 0.1, or 10%. With a further increase of R/G to about 3, the fraction of wrongly classified pixels drops further to about 0.015, or 1.5%. Therefore, in one embodiment, the R/G ratio is selected to be between about 2-3. In alternative embodiments, the R/G ratio is selected to be about 3.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of detecting whether a selected pixel in an electronic image F(t), having a pixel color, represents human skin in motion, comprising:
   calculating a first probability, $P_1$, indicating a likelihood that the color of the selected pixel appears within a first distribution of pixel colors observed in human skin, wherein the color of the selected pixel and the first distribution of pixel colors are represented in the CbCr color space;
   calculating a second probability, $P_2$, indicating a likelihood that the selected pixel color appears within a second distribution of pixel colors that are observed outside of human skin, wherein the second distribution of pixel colors are represented in the CbCr color space; and
   calculating a third probability, $P_K$, indicating a probability that the selected pixel represents human skin, wherein $P_K$ is a function of $P_1$ and $P_2$;
   wherein the selected pixel is determined to represent human skin in motion if an intensity difference, I, between the intensities of the selected pixel within F(t) and a temporally adjacent electronic image F(t-Δt) is greater than a threshold intensity value, T, which is a function of $P_K$.

2. The method of claim 1, wherein the second probability $P_2$ is calculated from the pixel color of the selected pixel, x', using a single Gaussian model, $P_{NS}$, that models a histogram of the second distribution of pixel colors, wherein $P_{NS}$ is described by a mean, $\mu_{NS}$, and a covariance, $\Sigma_{NS}$, which are obtained by fitting $P_{NS}$ to the histogram of the second distribution of pixel colors.

3. The method of claim 1, wherein the second probability $P_2$ is given by:

$$P_2 = P_{NS}(x' \mid \mu_{NS}, \Sigma_{NS}) = \frac{1}{(2\pi)^{p/2}|\Sigma_{NS}|^{1/2}} \exp\left(-\frac{1}{2}(x'-\mu_{NS})^T \Sigma_{NS}^{-1}(x'-\mu_{NS})\right)$$

wherein $$\mu_{NS} = \frac{1}{n}\sum_{j=1}^{n} x_j$$

$$\Sigma_{NS} = \frac{1}{n-1}\sum_{j=1}^{n}(x_j - \mu_{NS})(x_j - \mu_{NS})^T$$

and wherein n is an integer representing the number of pixels within the second distribution of pixel colors, $\mu_{NS}$ is the mean of $P_{NS}$, $\Sigma_{NS}$ is the covariant of $P_{NS}$, $|\Sigma_{NS}|$ is the determinant of $\Sigma_{NS}$, p is an integer representing the dimensionality of the color space of x', $x_j$ represents the $j^{th}$ pixel color of the second distribution of pixel colors, and $(x'-\mu_{NS})^T$ is the transpose of the matrix $(x-\mu_{NS})$.

4. The method of claim 2, wherein the first probability $P_1$ is calculated from the pixel color of the selected pixel, x', using a Gaussian Mixture Model, $P_S$, that models a histogram of the first distribution of pixel colors, wherein $P_S$ comprises of a sum of weighted Gaussian distributions, $p_i$, and wherein each of $p_i$ are described by a mean, $\mu_{S,i}$, and covariance, $\Sigma_{S,i}$ obtained by fitting $P_S$ to the histogram of the first distribution of pixel colors using an expectation maximization process.

5. The method of claim 3, wherein $P_1$ is given by:

$$P_1 = P_S(x' \mid \mu_{S,i}, \Sigma_{S,i}) = \sum_{i=1}^{M} \alpha_i p_i(x' \mid \mu_{S,i}, \Sigma_{S,i})$$

$$p_i(x' \mid \mu_{S,i}, \Sigma_{S,i}) = \frac{1}{(2\pi)^{p/2}|\Sigma_{S,i}|^{1/2}} \exp\left(-\frac{1}{2}(x'-\mu_{S,i})^T \Sigma_{S,i}^{-1}(x'-\mu_{S,i})\right)$$

$$\sum_{i=1}^{M} \alpha_i = 1$$

wherein x' is the pixel color, M is an integer representing the total number of Gaussian distributions comprising $P_S$, $p_i$ is the $i^{th}$ Gaussian distribution of $P_S$, $\mu_{S,i}$ is the mean of $p_i$, $\Sigma_{S,i}$ is the covariant of $p_i$, $|\Sigma_{S,i}|$ is the determinant of $\Sigma_{S,i}$, p is an integer representing the dimensionality of the color space of x', $(x'-\mu_{S,i})^T$ is the transpose of the matrix $(x'-\mu_{S,i})$, and $\alpha_i$ is a weighting factor of $p_i$, and wherein:

$$\mu_{S,i} = \frac{1}{m}\sum_{j=1}^{m} x_j$$

$$\Sigma_{S,i} = \frac{1}{m-1}\sum_{j=1}^{m}(x_j - \mu_{S,i})(x_j - \mu_{S,i})^T$$

wherein m is an integer representing the number of pixels in Gaussian i of the histogram of the first distribution of pixel colors, $(x_j-\mu_{S,i})^T$ is the transpose of the matrix $(x_j-\mu_{S,i})$ and $x_j$ is the $j^{th}$ pixel within the cluster i in the first distribution of pixel colors.

6. The method of claim 4, wherein $P_K$ is further a function of the ratio of the number of pixels within the first distribution of pixel colors and the total number of pixels in the first and second distributions of pixel colors, $f_1$, and the ratio of the number of pixels within the second distribution of pixel colors and the total number of pixels in the first and second distributions of pixel colors, $f_2$.

7. The method of claim 5, wherein $P_K$ is calculated according to:

$$P_K = \frac{P_1 f_1}{P_1 f_2 + P_2 f_2}$$

wherein $f_1$ comprises ratio of the number of pixels within the first distribution of pixel colors and the total number of pixels in the first and second distributions of pixel colors and $f_2$ comprises the ratio of the number of pixels within the second distribution of pixel colors and the total number of pixels in the first and second distributions of pixel colors.

8. The method of claim 1, further comprising a filtering operation which identifies pixels of F(t) which are not to selected as human skin pixels in motion, the filtering operation comprising:
calculating a ratio of a red color value to a green color value, R/G, of the pixel color of the selected pixel represented in the RGB color space; and
setting $P_K$ of the selected pixel to zero if R/G is greater than a selected value.

9. The method of claim 1, wherein the threshold intensity value, T, is given by the equation:

$$T=(T_1-T_2)P_K+T_2$$

wherein $T_1$ and $T_2$ are selected intensity values and wherein $T_2$ is greater than $T_1$.

10. A system for identifying the motion of a selected pixel having a pixel color within a plurality of temporally adjacent electronic images, comprising:
a skin likelihood calculator,
wherein the skin likelihood calculator employs a skin color model which models a first histogram distribution of pixel colors representing human skin in order to calculate a skin likelihood, $P_1$, representing a likelihood of observing the color of the selected pixel in human skin; and wherein the skin likelihood calculator further employs a non-skin color model which models a second histogram distribution of pixel colors which do not represent human skin in order to calculate a non-skin likelihood, $P_2$, representing a likelihood of observing the color of the selected pixel outside of human skin wherein the pixel color of the selected pixel and the first and second histogram distributions are represented in the CbCr color space;
a posterior probability calculator which employs a Bayesian equation, the color of the selected pixel, and the skin and non-skin likelihoods $P_1$ and $P_2$ in order to calculate a probability that the selected pixel represents human skin; and
a motion detection engine which determines that the selected pixel represents human skin in motion if a difference in intensity of the selected pixel between a first electronic image and a second electronic image selected from the plurality of electronic images is greater than a threshold intensity value, T, wherein T is a function of $P_K$.

11. The system of claim 10, wherein the threshold intensity value is a linear function of $P_K$.

12. The system of claim 11, wherein the threshold intensity value, T, is given by:

$$T=(T_1-T_2)P_K+T_2$$

wherein $T_1$ and $T_2$ are selected intensity values and $T_2$ is greater than $T_1$.

13. The system of claim 10, wherein the non-skin color probability $P_2$ is calculated according to:

$$P_2 = P_{NS}(x' \mid \mu_{NS}, \Sigma_{NS}) = \frac{1}{(2\pi)^{p/2}|\Sigma_{NS}|^{1/2}}\exp\left(-\frac{1}{2}(x'-\mu_{NS})^T \Sigma_{NS}^{-1}(x'-\mu_{NS})\right)$$

wherein $$\mu_{NS} = \frac{1}{n}\sum_{j=1}^{n} x_j$$

$$\Sigma_{NS} = \frac{1}{n-1}\sum_{j=1}^{n}(x_j-\mu_{NS})(x_j-\mu_{NS})^T$$

and wherein $P_{NS}$ is a mathematical representation of the non-skin color model, x' is the pixel color of the selected pixel, n is an integer comprising the number of pixels represented by the second histogram distribution, $\mu_{NS}$ is the mean of $P_{NS}$, $\Sigma_{NS}$ is the covariant of the $P_{NS}$, $|\Sigma_{NS}|$ is the determinant of $\Sigma_{NS}$, p is an integer representing the dimensionality of x', $x_j$ represents the $j^{th}$ pixel color of the second color histogram, and $(x'-\mu_{NS})^T$ is the transpose of the matrix $(x'-\mu_{NS})$.

14. The system of claim 10, wherein the skin likelihood $P_1$ is calculated according to:

$$P_1 = P_S(x' \mid \mu_{1,i}, \Sigma_{1,i}) = \sum_{i=1}^{M} \alpha_i p_i(x' \mid \mu_{1,i}, \Sigma_{1,i})$$

wherein $$p_i(x' \mid \mu_{1,i}, \Sigma_{1,i}) = \frac{1}{(2\pi)^{p/2}|\Sigma_{1,i}|^{1/2}}\exp\left(-\frac{1}{2}(x'-\mu_{1,i})^T \Sigma_{1,i}^{-1}(x'-\mu_{1,i})\right)$$

$$\sum_{i=1}^{M}\alpha_i = 1$$

and wherein $$\mu_{1,i} = \frac{1}{m}\sum_{j=1}^{m} x_j$$

$$\Sigma_{1,i} = \frac{1}{m-1}\sum_{j=1}^{m}(x_j - \mu_{1,i})(x_j - \mu_{1,i})^T$$

wherein $P_S$ is a mathematical representation of the skin color model, x' is the pixel color, M is an integer representing the total number of Gaussian distributions comprising $P_S$, $p_i$ is the $i^{th}$ Gaussian distribution of $P_S$, $\mu_{S,i}$ is the mean of $p_i$, $\Sigma_{S,i}$ is the covariant of $p_i$, $|\Sigma_{S,i}|$ is the determinant of $\Sigma_{S,i}$, p is an integer representing the dimensionality of the color space of x', $(x'-\mu_{S,i})^T$ is the transpose of the matrix $(x-\mu_{S,i})$, and $\alpha_i$ is a weighting factor of $p_i$.

15. The system of claim 10, wherein the skin probability $P_K$ is given by:

$$P_K = \frac{P_1 f_1}{P_1 f_2 + P_2 f_2}$$

wherein $f_1$ comprises the ratio of the number of pixels represented by the first histogram distribution and the sum of the pixels represented by the first and second histogram distributions and $f_2$ is the ratio of the number of pixels represented by the second histogram distribution and the sum of the pixels represented by the first and second histogram distributions.

16. A method of detecting the motion of human skin within a video, comprising:

receiving at least a first video frame and a second video frame which are temporally adjacent to one another;

selecting a pixel from the first video frame, the pixel having a pixel color;

calculating a skin probability, $P_K$ that the selected pixel represents human skin, wherein the skin probability $P_K$ is a function of a likelihood of observing the selected pixel's color in a first plurality of pixels representing human skin and a likelihood of observing the selected pixel's color in a second plurality of pixels not representing human skin, wherein the pixel color of the selected pixel and the first and second plurality of pixels are represented in the CbCr color space;

comparing an intensity difference, I, between the selected pixel within the first and second video frames to a threshold intensity, T, comprising a function of $P_K$;

wherein the selected pixel is considered to represent the motion of human skin if the value of I is greater than T.

17. The method of claim 16, wherein the likelihood of observing the color of the selected pixel in the first plurality of pixels is determined from a first probability distribution, $P_S$, comprising a plurality of Gaussian distributions which are fit to a histogram distribution of the pixel colors of the first plurality of pixels using an expectation maximization process.

18. The method of claim 17, wherein $P_1$ is given by the output of the first probability distribution $P_S$ for the pixel color of the selected pixel color, x', comprising:

$$P_1 = P_S(x' \mid \mu_{S,i}, \Sigma_{S,i}) = \sum_{i=1}^{M}\alpha_i p_i(x' \mid \mu_{S,i}, \Sigma_{S,i})$$

wherein $$p_i(x' \mid \mu_{S,i}, \Sigma_{S,i}) = \frac{1}{(2\pi)^{p/2}|\Sigma_{S,i}|^{1/2}}\exp\left(-\frac{1}{2}(x'-\mu_{S,i})^T \Sigma_{S,i}^{-1}(x'-\mu_{S,i})\right)$$

$$\sum_{i=1}^{M}\alpha_i = 1$$

and wherein $$\mu_{S,i} = \frac{1}{m}\sum_{j=1}^{m}x_j$$

$$\Sigma_{S,i} = \frac{1}{m-1}\sum_{j=1}^{m}(x_j - \mu_{S,i})(x_j - \mu_{S,i})^T$$

wherein, M is an integer representing the total number of Gaussian distributions comprising $P_S$, $p_i$ is the $i^{th}$ Gaussian distribution of $P_S$, $\mu_{S,i}$ is the mean of $p_i$, $\Sigma_{S,i}$ is the covariant of $p_i$, $|\Sigma_{S,i}|$ is the determinant of $\Sigma_{S,i}$, p is an integer representing the dimensionality of the color space of x', $(x'-\mu_{S,i})^T$ is the transpose of the matrix $(x'-\mu_{S,i})$, $\alpha_i$ is a weighting factor of $p_i$, m is an integer representing the number of pixels in Gaussian i of the histogram of the first distribution of pixel colors, $(x_j-\mu_{S,i})^T$ is the transpose of the matrix $(x_j-\mu_{S,i})$, and $x_j$ is the $j^{th}$ pixel within the cluster i in the first distribution of pixel colors.

19. The method of claim 17, wherein the likelihood of observing the color of the selected pixel in the second plurality of pixels is determined from a second probability distribution, $P_{NS}$, comprising a single Gaussian distribution which is fit to a histogram distribution of the pixel colors of the second plurality of pixels.

20. The method of claim 19, wherein $P_2$ is given by the output of the second probability distribution $P_{NS}$ for the pixel color of the selected pixel color, x', comprising:

$$P_2 = P_{NS}(x' \mid \mu_{NS}, \Sigma_{NS}) = \frac{1}{(2\pi)^{p/2}|\Sigma_{NS}|^{1/2}}\exp\left(-\frac{1}{2}(x'-\mu_{NS})^T \Sigma_{NS}^{-1}(x'-\mu_{NS})\right)$$

wherein $$\mu_{NS} = \frac{1}{n}\sum_{j=1}^{n}x_j$$

$$\Sigma_{NS} = \frac{1}{n-1}\sum_{j=1}^{n}(x_j - \mu_{NS})(x_j - \mu_{NS})^T$$

and wherein n is an integer representing the number of pixels within the second plurality of electronic images, $\mu_{NS}$ is the mean of $P_{NS}$, $\Sigma_{NS}$ is the covariant of $P_{NS}$, $|\Sigma_{NS}|$ is the determinant of $\Sigma_{NS}$, p is an integer representing the dimensionality of the color space of x', $x_j$ represents the $j^{th}$ pixel color of P and $(x'-\mu_{NS})^T$ is the transpose of the matrix $(x'-\mu_{NS})$.

21. The method of claim 20, wherein the probability $P_K$ comprises:

$$P_K = \frac{P_1 f_1}{P_1 f_2 + P_2 f_2}$$

wherein $f_1$ comprises the pixel fraction of the plurality of electronic training images which consists of human skin and wherein $f_2$ is the pixel fraction of the plurality of electronic training images which is consists of human skin.

22. The method of claim 16, wherein the threshold intensity value, T, is given by:

$$T=(T_1-T_2)P_K+T_2$$

wherein $T_1$ and $T_2$ are selected intensity values and wherein $T_2$ is greater than $T_1$.

23. A system for detecting human motion within a video, comprising:
a video source capable of transmitting a plurality of video frames; and
a motion evaluation system which receives at least a first and a second temporally adjacent video frames from the video source, the motion evaluation system comprising a skin probability calculator and a motion detection engine;
wherein the skin probability calculator calculates a posterior skin probability, $P_K$, for at least one selected pixel within the plurality of video frames represents human skin, the posterior skin probability $P_K$ comprising a probability of observing the pixel color of the selected pixel in a first histogram distribution of pixel colors representing human skin, $P_S$, and a probability of observing the pixel color of the selected pixel in a second histogram distribution of pixel colors which do not represent human skin, $P_{NS}$,
wherein the pixel color of the selected pixel and the first and second histogram distributions are represented in the CbCr color space; and
wherein motion detection engine determines that the selected pixel is in motion if an intensity difference of the selected pixel between the first electronic image and the second electronic image is greater than a threshold intensity, T, which comprises a function of $P_K$.

24. The system of claim 23, wherein the likelihood of observing the pixel color of the selected pixel in the first histogram distribution is determined from a first probability distribution, $P_S$, comprising a plurality of Gaussian distributions which are fit to the first histogram distribution using an expectation maximization process.

25. The system of claim 23, wherein the likelihood of observing the pixel color of the selected pixel in the second histogram distribution is determined from a second probability distribution, $P_{NS}$, comprising a single Gaussian distribution which is fit to the second histogram distribution.

* * * * *